United States Patent  (10) Patent No.: US 11,755,927 B2
Pritchard et al.  (45) Date of Patent: Sep. 12, 2023

(54) IDENTIFYING ENTITLEMENT RULES BASED ON A FREQUENT PATTERN TREE

(71) Applicant: Bank of America Corporation, Charlotte, NC (US)

(72) Inventors: David Pritchard, London (GB); Rajesh Gopinathapai, Aurora, IL (US); Jennifer Lynn Greenwald, Chicago, IL (US)

(73) Assignee: Bank of America Corporation, Charlotte, NC (US)

( * ) Notice: Subject to any disclaimer, the term of this patent is extended or adjusted under 35 U.S.C. 154(b) by 1013 days.

(21) Appl. No.: 16/549,325

(22) Filed: Aug. 23, 2019

(65) Prior Publication Data

US 2021/0056442 A1 Feb. 25, 2021

(51) Int. Cl.
| | |
|---|---|
| G06N 5/02 | (2023.01) |
| G06F 16/28 | (2019.01) |
| G06F 16/22 | (2019.01) |
| H04L 29/08 | (2006.01) |
| G06N 5/025 | (2023.01) |
| H04L 67/306 | (2022.01) |

(52) U.S. Cl.
CPC ......... *G06N 5/025* (2013.01); *G06F 16/2246* (2019.01); *G06F 16/288* (2019.01); *H04L 67/306* (2013.01)

(58) Field of Classification Search
CPC ... G06N 5/025; G06F 16/2246; G06F 16/288; H04L 67/306
See application file for complete search history.

(56) References Cited

U.S. PATENT DOCUMENTS

| | | |
|---|---|---|
| 6,665,669 B2 | 12/2003 | Han et al. |
| 7,403,925 B2 | 7/2008 | Schlesinger et al. |
| 7,467,414 B2 | 12/2008 | Schlesinger |
| 7,509,677 B2 | 3/2009 | Saurabh et al. |

(Continued)

OTHER PUBLICATIONS

FP tree example (How to identify frequent patterns using FP tree algorithm), hareenlaks—sharing knowledge and experience, Jun. 9, 2011, four pages, found at http://hareenlaks.blogspot.com/2001/06/fp-tree-example-how-to-identify.html.

*Primary Examiner* — Sherief Badawi
*Assistant Examiner* — Earl Elias
(74) *Attorney, Agent, or Firm* — Banner & Witcoff, Ltd.

(57) ABSTRACT

Aspects of the disclosure relate to identifying entitlement rules based on a frequent pattern tree. A computing platform may retrieve entitlement data associated with a relational database, where the entitlement data is indicative of user entitlements to computing resources in an enterprise network. Then, the computing platform may generate, for the entitlement data, a frequent pattern tree. Then, the computing platform may compare a pair of branches and may detect a pattern associated with a pair of entitlements. Then, the computing platform may determine, based on the frequent pattern tree, a frequency of occurrence of the pattern. Then, the computing platform may identify, based on the frequency of occurrence, a rule associated with the pattern. Subsequently, the computing platform may trigger, via the computing device and based on the rule, an action related to one or more of the entitlements of the pair of entitlements.

16 Claims, 10 Drawing Sheets

(56) References Cited

U.S. PATENT DOCUMENTS

| | | | |
|---|---|---|---|
| 7,698,170 B1* | 4/2010 | Darr | G06Q 30/0609 |
| | | | 705/26.35 |
| 7,984,502 B2 | 7/2011 | Saurabh et al. | |
| 8,132,231 B2 | 3/2012 | Amies et al. | |
| 8,812,543 B2 | 8/2014 | Kanagasabapathi et al. | |
| 9,684,793 B2 | 6/2017 | Schlesinger et al. | |
| 9,801,066 B1* | 10/2017 | Hanley | G06Q 20/40145 |
| 9,830,451 B2 | 11/2017 | Singla et al. | |
| 2003/0009467 A1* | 1/2003 | Perrizo | G06F 16/9027 |
| 2007/0005598 A1* | 1/2007 | Okamoto | G06F 16/345 |
| 2009/0112887 A1* | 4/2009 | Weber | G06F 16/84 |
| | | | 707/E17.127 |
| 2012/0143913 A1* | 6/2012 | Beier | H03M 7/46 |
| | | | 707/E17.014 |
| 2015/0193853 A1* | 7/2015 | Ayzenshtat | G06Q 30/0631 |
| | | | 705/26.7 |
| 2016/0253366 A1 | 9/2016 | Hsu et al. | |
| 2018/0107695 A1* | 4/2018 | Yang | G06F 16/2465 |
| 2019/0180193 A1* | 6/2019 | Sinha | G06N 3/04 |

\* cited by examiner

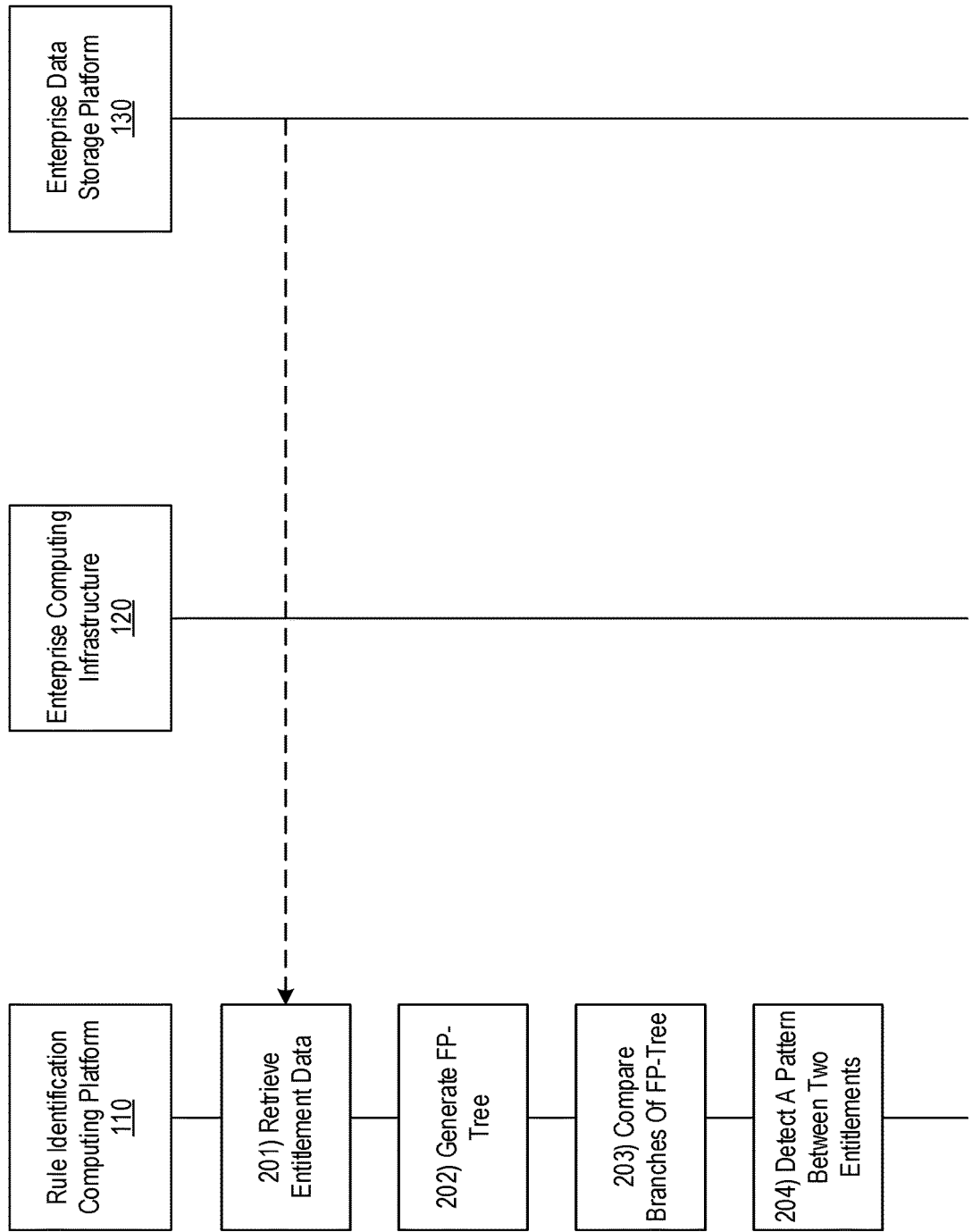

| Number | Entitlement List |
|---|---|
| 1 | I, IV, II |
| 2 | IV, I, III, II |
| 3 | III, I, II |
| 4 | II, I, V |
| 5 | IV |
| 6 | IV, II, V |
| 7 | I, IV, VI |
| 8 | II, III |

FIG. 3A

| Entitlement | Frequency | Rank |
|---|---|---|
| I | 5 | 2 |
| II | 6 | 1 |
| III | 3 | 4 |
| IV | 5 | 3 |
| V | 2 | 5 |
| VI | 1 | 6 |

FIG. 3B

| Number | Entitlement List | Ordered Entitlement List |
|---|---|---|
| 1 | I, IV, II | II, I, IV |
| 2 | IV, I, III, II | II, I, IV, III |
| 3 | III, I, II | II, I, III |
| 4 | II, I, V | II, I, V |
| 5 | IV | IV |
| 6 | IV, II, V | II, IV, V |
| 7 | I, IV, VI | I, IV, VI |
| 8 | II, III | II, III |

FIG. 3C

IDENTIFYING ENTITLEMENT RULES BASED ON A FREQUENT PATTERN TREE

BACKGROUND

Aspects of the disclosure relate to deploying digital data processing systems to detect hidden patterns in entitlement allocations to software applications in an enterprise system. In particular, one or more aspects of the disclosure relate to identifying entitlement rules based on a frequent pattern tree ("FP-tree").

Enterprise organizations may utilize various resources to support their computing infrastructure. For large enterprise organizations, maintaining, updating and managing access controls to various enterprise resources may be of significant importance in protecting confidential information and/or other sensitive data that is created, transmitted, and/or used for various purposes. Such maintaining, updating and managing access controls may be time-sensitive and might need to be performed in real-time. Ensuring that appropriate entitlements are properly identified, and timely and targeted modifications of entitlements are performed, in real time with speed and accuracy, may be particularly advantageous to ensure a smooth running of the enterprise infrastructure. In many instances, however, it may be difficult to extract hidden entitlement rules in an organization's complex network comprising a vast number of network devices and users with multiple combinations of entitlements to these network devices and/or other network resources, with speed and accuracy, while also attempting to optimize network resources, bandwidth utilization, and efficient operations of the computing infrastructure.

SUMMARY

Aspects of the disclosure provide effective, efficient, scalable, fast, reliable, and convenient technical solutions that address and overcome the technical problems associated with identifying entitlement rules based on a frequent pattern tree.

In accordance with one or more embodiments, a system of one or more computers may be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computing platform, including at least one processor. The computing platform also includes a communication interface communicatively coupled to the at least one processor and memory storing computer-readable instructions that, when executed by the at least one processor, cause the computing platform to retrieve, via a computing device, entitlement data associated with a relational database, where the entitlement data is indicative of user entitlements to computing resources in an enterprise network. Then, the computing platform may generate, via the computing device and for the entitlement data, a frequent pattern tree comprising that includes a plurality of branches, where each branch represents a list of entitlements that appear together in the relational database, and a plurality of nodes within each branch, wherein each node represents an entitlement, and a count of users associated with the entitlement. Then, the computing platform may compare, via the computing device, a first branch of the plurality of branches and a second branch of the plurality of branches. Subsequently, the computing platform may detect, via the computing device and based on the comparing, a pattern associated with a first entitlement of a first list represented by the first branch, and a second entitlement of a second list represented by the second branch. Then, the computing platform may determine, based on the frequent pattern tree, a frequency of occurrence of the pattern. Then, the computing platform may identify, based on the frequency of occurrence, a rule associated with the pattern. Subsequently, the computing platform may trigger, via the computing device and based on the rule, an action related to one or more of the first entitlement and the second entitlement.

In some embodiments, the computing platform may determine, via the computing device and based on the frequency of occurrence, a correlation between the first entitlement and the second entitlement, and where triggering the action may be based on the correlation.

In some embodiments, the instructions that cause the computing platform to trigger the action may include additional computer-readable instructions that, when executed by the at least one processor, cause the computing platform to recommend, based on the rule, an outcome for a request for an entitlement.

In some embodiments, the computing platform may determine a confidence level for the rule, and where triggering the action may be based on the confidence level.

In some embodiments, the computing platform may modify, based on the rule, one or more of the first entitlement and the second entitlement.

In some embodiments, the computing platform may identify, based on the first branch, a first group of users sharing a common attribute. Then, the computing platform may modify, for one or more users of the first group, the first entitlement.

In some embodiments, the computing platform may monitor the relational database. Then, the computing platform may detect a change to the entitlement data. Subsequently, the computing platform may update, based on the detected change, the frequent pattern tree. In some embodiments, the computing platform may update, based on the updated frequent pattern tree, the rule.

In some embodiments, the computing platform may identify, for the first branch, a first attribute for a first group of users associated with the first entitlement. Then, the computing platform may identify, for the second branch, a second attribute for a second group of users associated with the second entitlement. Subsequently, the computing platform may update, based on the first attribute and the second attribute, the rule.

In some embodiments, the computing platform may determine that the first branch does not include a node representing the second entitlement, and that the second branch does not include a node representing the first entitlement. Then, the computing platform may infer that no user is associated with the first entitlement and the second entitlement.

In some embodiments, the computing platform may determine that the first branch includes a node representing the second entitlement. Then, the computing platform may infer that one or more users have the first entitlement and the second entitlement. Then, the computing platform may identify at least one attribute associated with the one or more users. Subsequently, the computing platform may update, based on the at least one attribute, the rule.

In some embodiments, the computing platform may adjust a threshold support count for the frequent pattern tree, where identifying the rule may be based on the threshold support count.

Implementations of these and other embodiments may include hardware, a method or process, or computer software on a computer-accessible medium.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2C depict an illustrative event sequence for identifying entitlement rules based on an FP-tree in accordance with one or more example embodiments;

FIGS. 3A-3F depict an illustrative FP-tree model for identifying entitlement rules based on an FP-tree in accordance with one or more example embodiments.

DETAILED DESCRIPTION

Figure 1A:
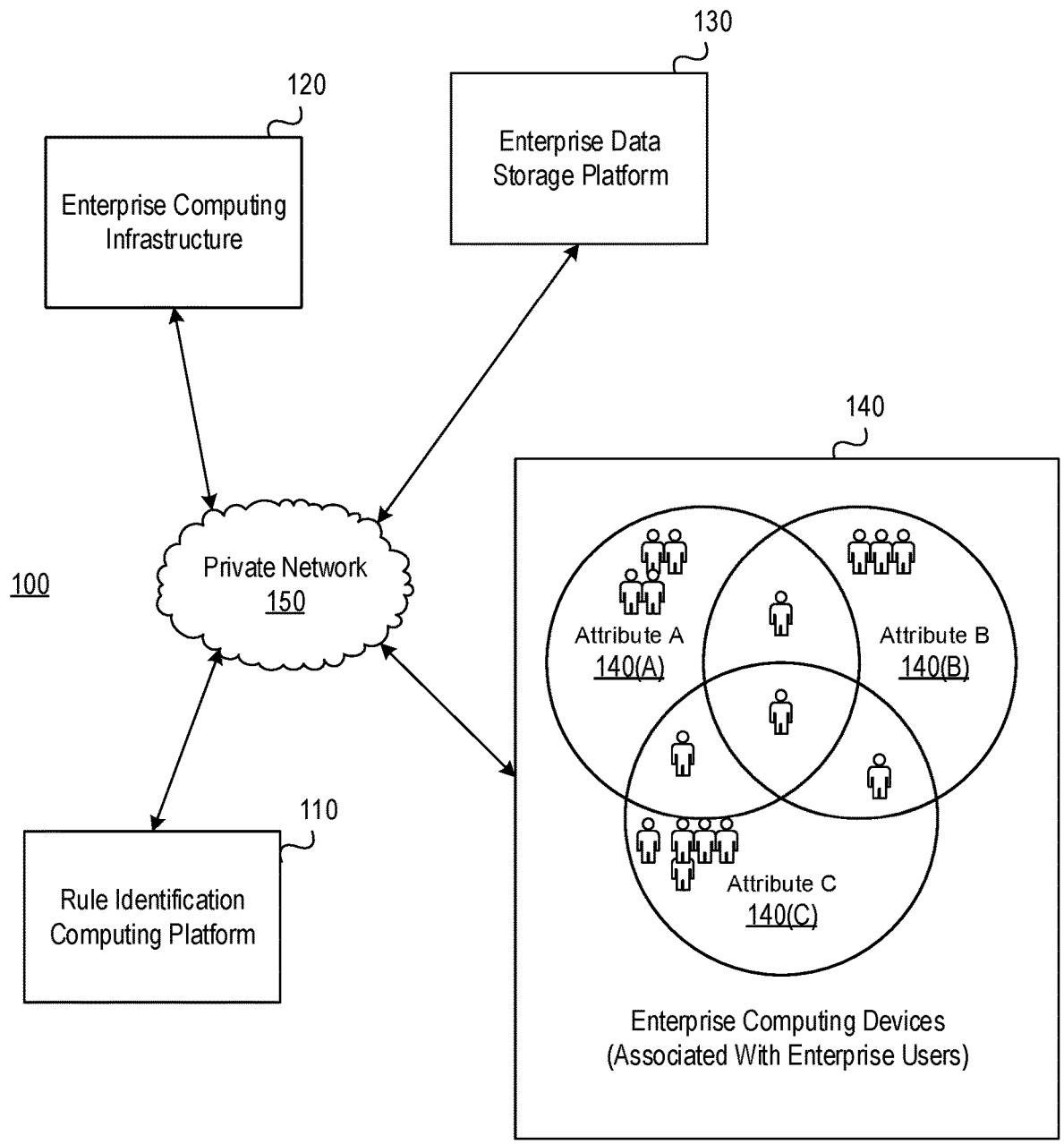
FIGS. 1A and 1B depict an illustrative computing environment for identifying entitlement rules based on an FP-tree in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to identifying entitlement rules based on an FP-tree. For example, an enterprise software server infrastructure may deploy computing resources such as network devices, web resources, file directories, software applications, and so forth. In some instances, user access may need to be restricted to some of the enterprise resources, based, for example, on an enterprise user's role within the enterprise organization. For large enterprise organizations with vast amounts of deployed resources and a large number of employees, the potential combinations of access restrictions may form complex lists of entitlements. Additionally, with new resources being added, changes in employment status of enterprise users, and changes in roles, may all create a dynamic and changing environment that may require to be managed. For example, an enterprise employee of a financial institution who creates a trade may not have access permissions to approve and release the trade.

In many instances, due to a plethora of combinations of access permissions, it may be highly improbable to detect, via a manual process, all the access permissions that may be in place at any given time. Additionally, many of the access permissions may be changed by users, managers, and/or may be based on various geographical locations. In some instances, access permissions may be automatically changed when new applications are deployed in a computing infrastructure, new employees are provided access to computing resources, and so forth. Also, for example, access permissions may be associated with a network that may be used to access a resource. For example, for a given user, access permissions to some resources may differ based on whether the access is from home or from an office. As another example, for a given user, access permissions may differ based on a device that may be used to access a resource; entitlements for mobile devices may differ from entitlements for desktop computers.

Accordingly, aspects of this disclosure relate to automated pattern detection to identify hidden rules in entitlements, and initiate actions to mitigate any risks that may arise from such hidden rules. Identifying such hidden rules via a manual process and/or based on mental steps is unlikely. Also, the information resides over a vast array of users and network devices, thereby necessitating a use of computing devices to access the data over networks, generate a pattern detection model in real-time as the data changes, and initiate relevant action. It may be noted, that as access permissions are related to resources available over a computing network, the problem of detecting hidden patterns arises in the realm of networks, and as described herein, a solution is necessarily rooted in computer technology to overcome a problem arising in the realm of computer networks.

Figure 1B:
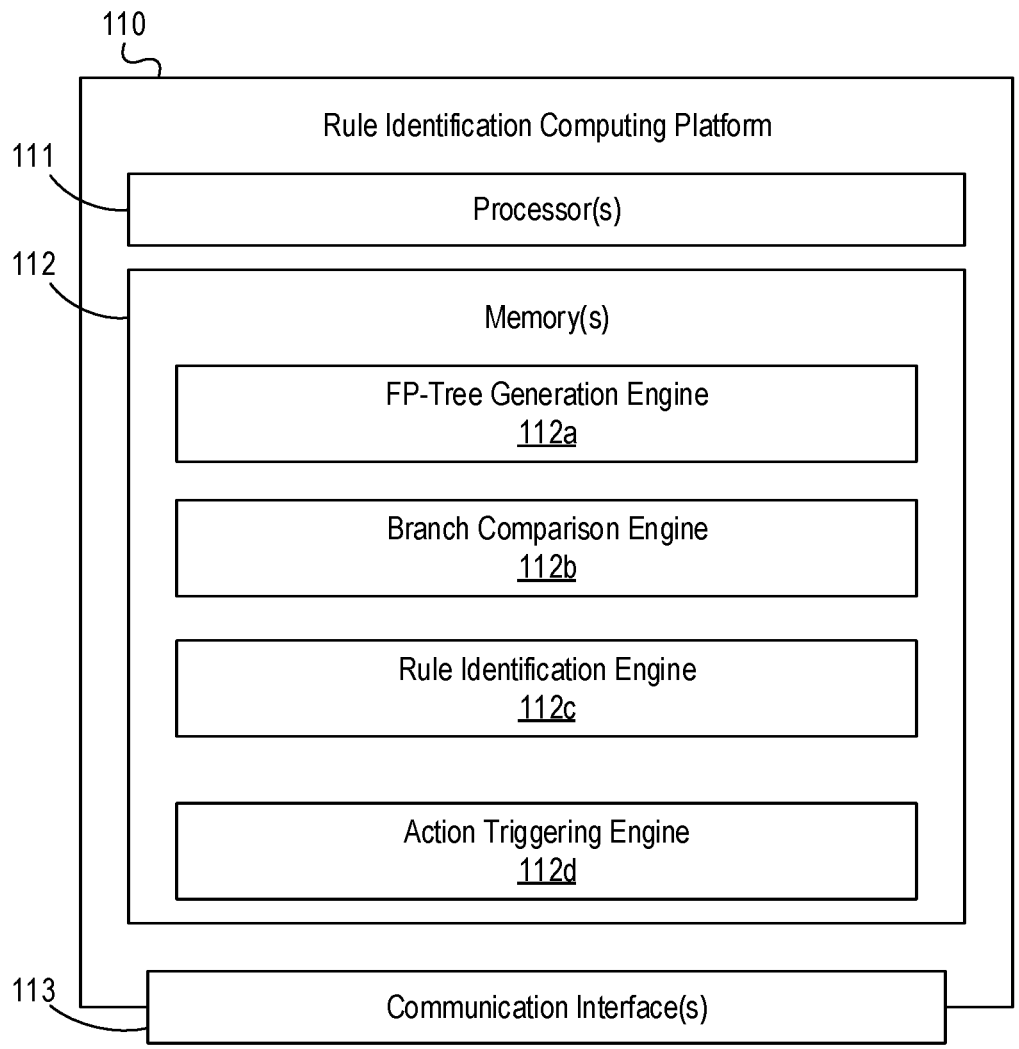

FIGS. 1A and 1B depict an illustrative computing environment for identifying entitlement rules based on an FP-tree in accordance with one or more example embodiments. Referring to FIG. 1A, computing environment 100 may include one or more computer systems. For example, computing environment 100 may include rule identification computing platform 110, enterprise computing infrastructure 120, enterprise data storage platform 130, and enterprise computing devices 140.

As illustrated in greater detail below, rule identification computing platform 110 may include one or more computing devices configured to perform one or more of the functions described herein. For example, rule identification computing platform 110 may include one or more computers (e.g., laptop computers, desktop computers, servers, server blades, or the like) and/or other computer components (e.g., processors, memories, communication interfaces).

Enterprise computing infrastructure 120 may include one or more computing devices and/or other computer components (e.g., processors, memories, communication interfaces). In addition, enterprise computing infrastructure 120 may be configured to host, execute, and/or otherwise provide one or more software applications. For example, enterprise computing infrastructure 120 may be configured to host, execute, and/or otherwise provide entitlements to enterprise devices, and/or other programs associated with an enterprise server. In some instances, enterprise computing infrastructure 120 may be configured to provide various enterprise and/or back-office computing functions for an enterprise organization, such as a financial institution. For example, enterprise computing infrastructure 120 may include various servers and/or databases that store and/or otherwise maintain account information, such as financial account information including account balances, transaction history, account owner information, and/or other information. Also, for example, enterprise computing infrastructure 120 may include various servers and/or databases that may manage information technology resources for the enterprise organization. For example, enterprise computing infrastructure 120 may include various servers and/or databases that may manage entitlements for enterprise computing devices 140. Additionally, or alternatively, enterprise computing infrastructure 120 may receive instructions from rule identification computing platform 110 and execute the instructions in a timely manner.

Enterprise data storage platform 130 may include one or more computing devices and/or other computer components (e.g., processors, memories, communication interfaces). In addition, and as illustrated in greater detail below, enterprise data storage platform 130 may be configured to store and/or otherwise maintain enterprise data, including user entitlements to resources hosted, executed, and/or otherwise provided by enterprise computing infrastructure 120. Additionally, or alternatively, enterprise computing infrastructure 120 may load data from enterprise data storage platform 130, manipulate and/or otherwise process such data, and return modified data and/or other data to enterprise data storage platform 130 and/or to other computer systems included in computing environment 100.

Enterprise computing devices 140 may be personal computing devices (e.g., desktop computer, laptop computer) or mobile computing devices (e.g., smartphone, tablet). In addition, each of the enterprise computing devices 140 may be linked to and/or used by a specific enterprise user (who may, e.g., be an employee or other affiliate of an enterprise organization operating rule identification computing platform 110). A specific enterprise user may be associated with one or more user attributes, such as, for example, Attribute A 140(A), Attribute B 140(B), and/or Attribute C 140(C). For example, Attribute A 140(A) may be "IT Personnel" and Attribute B 140(B) may be "Sales Representative." In this instance, it is likely that users associated with Attribute A 140(A) are distinct from users associated with Attribute B 140(B). In some instances, entitlements to various systems, servers, and/or databases in enterprise computing infrastructure 120 assigned to users associated with Attribute A 140(A) are also likely to be distinct from entitlements assigned to users associated with Attribute B 140(B). As another example, Attribute A 140(A) may be "Executive Leader," Attribute B 140(B) may be "Sales Lead," and Attribute C 140(C) may be "Personnel—Americas." In this instance, it is likely that there is an employee who is an Executive Leader, and is the Sales Lead for Americas region. Accordingly, this employee may be associated with Attribute A 140(A), Attribute B 140(B), and Attribute C 140(C).

Enterprise computing infrastructure 120 may include various servers and/or databases that may manage entitlements for enterprise users based on the one or more user attributes. Generally, entitlements may be provided based on job functions, job roles, geographic region, and so forth. Accordingly, allocation of entitlements may be performed by enterprise users and/or systems where one group of users providing a first set of entitlements may not have or be aware of another group of users providing a second set of entitlements. Accordingly, there may be many patterns that may be undetected. However, detecting these hidden patterns may significantly mitigate errors due to incorrect entitlements, and may also decrease a security risk profile of an enterprise.

Computing environment 100 also may include one or more networks, which may interconnect one or more of rule identification computing platform 110, enterprise computing infrastructure 120, enterprise data storage platform 130, and enterprise computing devices 140. For example, computing environment 100 may include private network 150 (which may interconnect, for example, rule identification computing platform 110, enterprise computing infrastructure 120, enterprise data storage platform 130, and enterprise computing devices 140, and/or one or more other systems which may be associated with an organization, such as a financial institution). In some instances, private network 150 may be communicate with a public network (which may interconnect, for example, one or more systems which may be associated with an organization with one or more other systems, public networks, sub-networks, and/or the like). Private network 150 and/or the public network may be a high generation cellular network, such as, for example, a fifth generation ("5G") or higher cellular network.

In one or more arrangements, rule identification computing platform 110, enterprise computing infrastructure 120, enterprise data storage platform 130, and enterprise computing devices 140, and/or the other systems included in computing environment 100 may be any type of computing device capable of communicating with a user interface, receiving input via the user interface, and communicating the received input to one or more other computing devices. For example, rule identification computing platform 110, enterprise computing infrastructure 120, enterprise data storage platform 130, and enterprise computing devices 140, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of rule identification computing platform 110, enterprise computing infrastructure 120, enterprise data storage platform 130, and enterprise computing devices 140, may, in some instances, be special-purpose computing devices configured to perform specific functions.

Referring to FIG. 1B, rule identification computing platform 110 may include one or more processors 111, memory 112, and communication interface 113. A data bus may interconnect processor 111, memory 112, and communication interface 113. Communication interface 113 may be a network interface configured to support communication between rule identification computing platform 110 and one or more networks (e.g., public network, private network, a local network, or the like). Memory 112 may include one or more program modules having instructions that when executed by processor 111 cause rule identification computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of rule identification computing platform 110 and/or by different computing devices that may form and/or otherwise make up rule identification computing platform 110. For example, memory 112 may have, store, and/or include FP-tree generation engine 112a, branch comparison engine 112b, rule identification engine 112c, and action triggering engine 112d. FP-tree generation engine 112a may have instructions that direct and/or cause rule identification computing platform 110 to retrieve, via a computing device, entitlement data associated with a relational database, where the entitlement data is indicative of user entitlements to computing resources in an enterprise network, as discussed in greater detail below. As used herein, the term, "relational database" or "graph database", may refer to any database that includes at least two objects and an association between the at least two objects. FP-tree generation engine 112a may also have instructions that direct and/or cause rule identification computing platform 110 to generate, via the computing device and for the entitlement data, an FP-tree, where the FP-tree includes a plurality of branches, where each branch represents a list of entitlements that appear together in the relational database, and a plurality of nodes within each branch, where each node represents an entitlement, and a count of users associated with the entitlement. Branch comparison engine 112b may have instructions to compare, via the computing device, a first branch of the plurality of branches and a second branch of the plurality of branches. Rule identification engine 112c may have instructions to detect, via the computing device and based on the comparing, a pattern associated with a first entitlement of a first list represented by the first branch, and a second entitlement of a second list represented by the second branch. Rule identification engine 112c may have instructions to determine, based on the frequent pattern tree, a frequency of occurrence of the pattern. Rule identification engine 112c may have instructions to identify, based on the frequency of occurrence, a rule associated with the pattern. Action triggering engine 112d may have instructions to trigger, via the computing device and based on the rule, an action related to one or more of the first entitlement and the second entitlement.

Figure 2B:
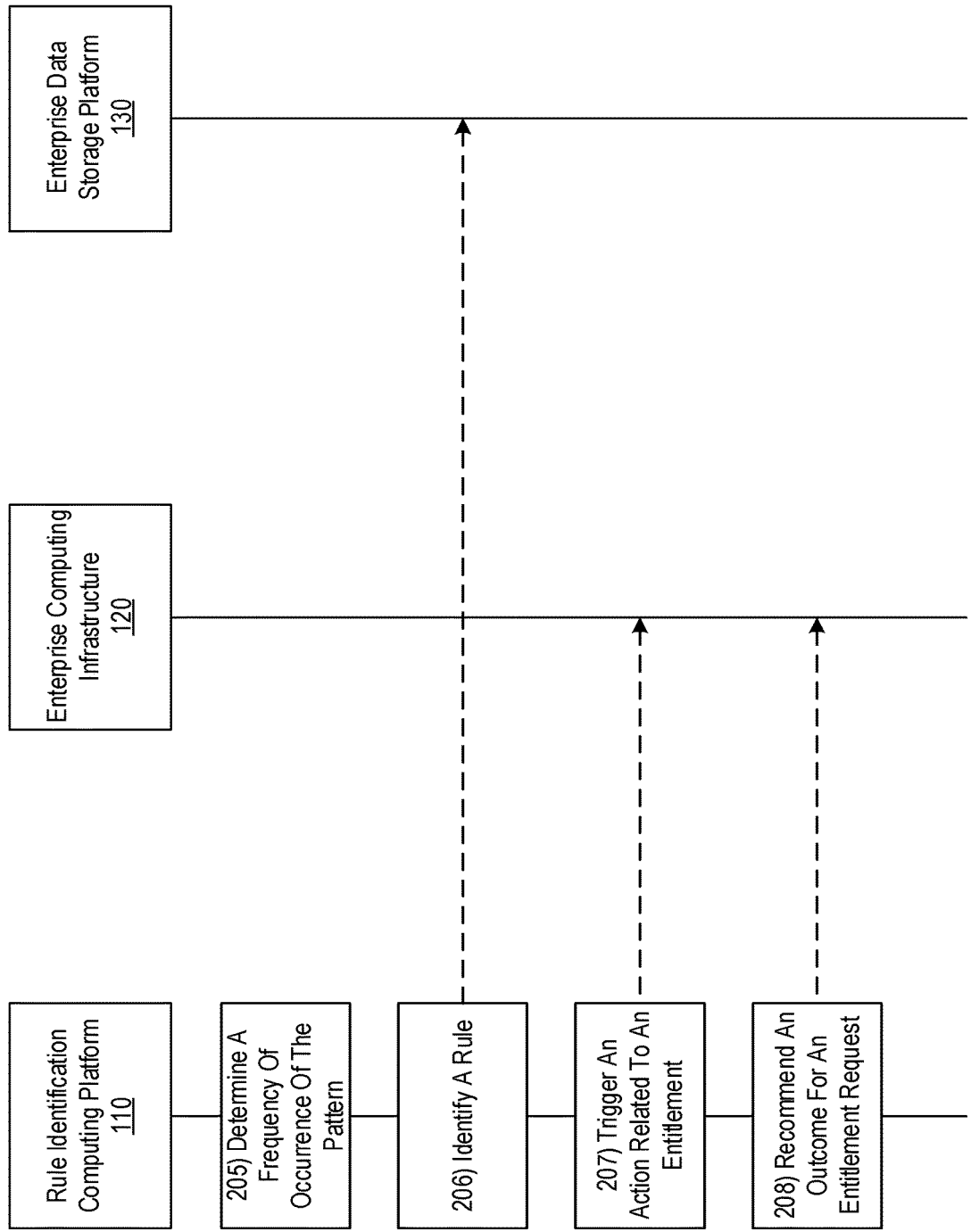
Figure 2C:
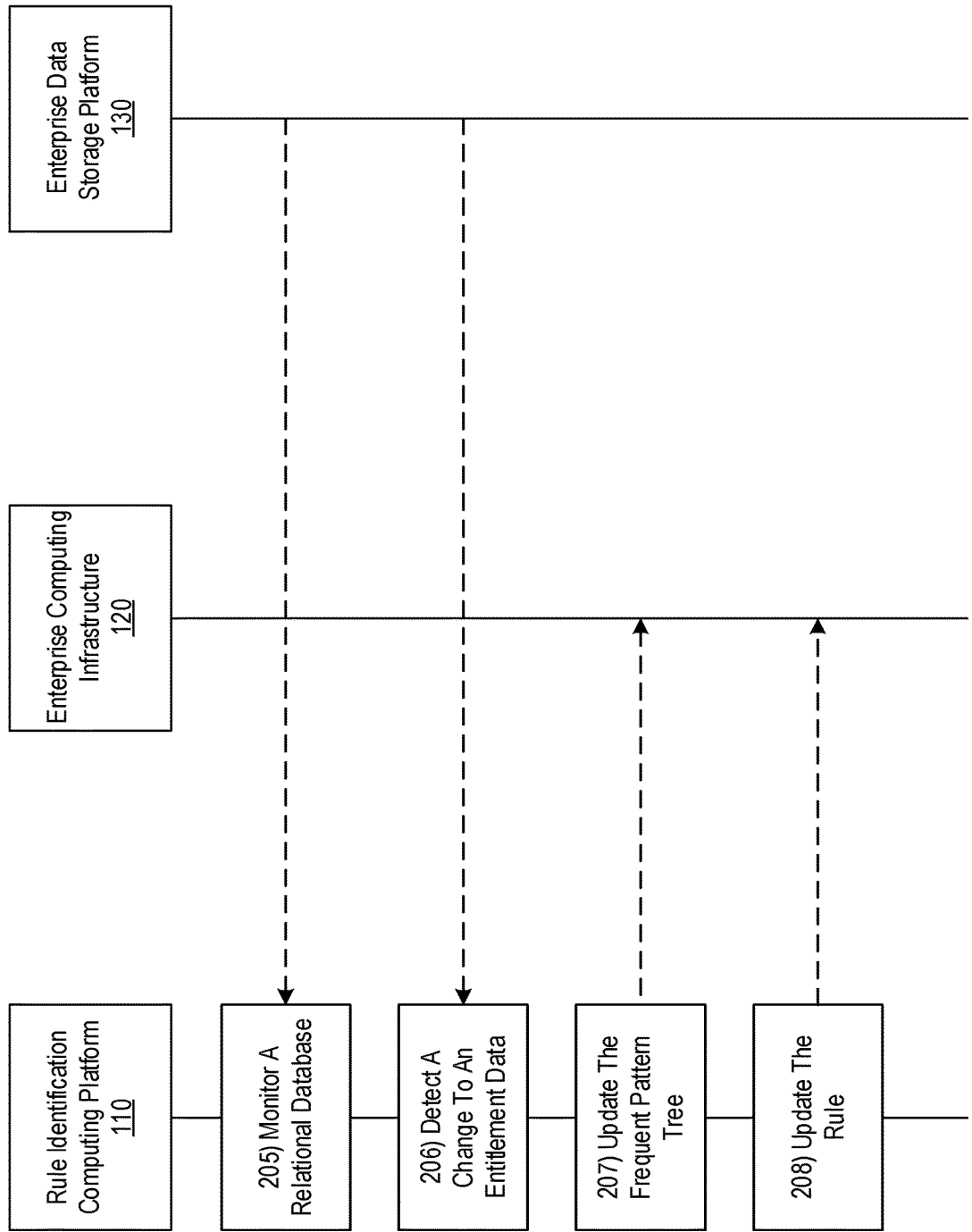

FIGS. 2A-2C depict an illustrative event sequence for identifying entitlement rules based on an FP-tree in accordance with one or more example embodiments. Referring to FIG. 2A, at step 201, rule identification computing platform 110 may retrieve, via a computing device, entitlement data associated with a relational database, where the entitlement data may be indicative of user entitlements to computing resources in an enterprise network. For example, entitlement data to enterprise resources may be organized in a relational database that associates users, locations, resources, devices, functional roles, and so forth with access permissions to various resources available over an enterprise network (e.g., enterprise computing infrastructure 120). Such entitlement data may be stored in an enterprise data storage platform (e.g., enterprise data storage platform 130) and available over a network (e.g., private network 150). In some embodiments, rule identification computing platform 110 may retrieve entitlement data from enterprise data storage platform 130 over private network 150.

At step 202, rule identification computing platform 110 may generate, for the entitlement data, an FP-tree including a plurality of branches, where each branch may represent a list of entitlements that appear together in the relational database, and a plurality of nodes within each branch, where each node represents an entitlement, and a count of users associated with the entitlement. As described herein, there may be a large number of combinations of entitlements or access permissions to various resources available over the network. Each entitlement may be associated with a count, or frequency, of users that have that entitlement. A frequent pattern tree ("FP-tree") may represent such frequent entitlements (e.g., as nodes in the FP-tree), and organize the entitlements into linked lists of entitlements that appear together in the relational database, as described in more detail with reference to FIGS. 3A-3F.

At step 203, rule identification computing platform 110 may compare, via the computing device, a first branch of the plurality of branches and a second branch of the plurality of branches. As described herein, each branch may represent a list of entitlements that appear together in the relational database. Accordingly, a comparison of two branches may be indicative of entitlements that may or may not appear together in the relational database. For example, referring to FIG. 3E, rule identification computing platform 110 may compare first branch 315 and second branch 320.

At step 204, rule identification computing platform 110 may detect, via the computing device and based on the comparing, a pattern associated with a first entitlement of a first list represented by the first branch, and a second entitlement of a second list represented by the second branch. For example, referring to FIG. 3E, rule identification computing platform 110 may detect a pattern, such as, for example, that a first entitlement, entitlement II, and a second entitlement, entitlement VI, are mutually exclusive. In some embodiments, rule identification computing platform 110 may determine that a first entitlement, entitlement I, and a second entitlement, entitlement IV, are not mutually exclusive.

In some embodiments, rule identification computing platform 110 may determine that the first branch does not include a node representing the second entitlement, and that the second branch does not include a node representing the first entitlement. For example, referring to FIG. 3E, rule identification computing platform 110 may determine that first branch 315 does not include a node representing a second entitlement, entitlement VI, and that second branch 320 does not include a node representing a first entitlement, entitlement II.

Referring to FIG. 2B, at step 205, rule identification computing platform 110 may determine, based on the frequent pattern tree, a frequency of occurrence of the pattern. For example, the pattern that entitlement II and entitlement VI are mutually exclusive may occur with a frequency of 2, or a frequency of several thousand. In some embodiments, rule identification computing platform 110 may compare a plurality of pairs of branches to identify a frequency of occurrence of the pattern.

In some embodiments, rule identification computing platform 110 may determine a threshold support count for the frequent pattern tree. The threshold support count is indicative of a minimum number or percentage of enterprise users that may be required to support a rule based on the pattern. For example, although two entitlements may be expected to be mutually exclusive, there may be a threshold support count of 0.05%. This would indicate that 0.05% of all users (or all users in an identified group of users) may be allowed to have both entitlements. For example, if an enterprise organization has 200,000 enterprise users, then 0.05% of 200,000 would be 100 enterprise users. In some embodiments, rule identification computing platform 110 may determine that the frequency of occurrence of the pattern is 50, which may be determined to be below the threshold support count. In some embodiments, rule identification computing platform 110 may determine that the frequency of occurrence of the pattern is 150, which may be determined to be above the threshold support count.

In some embodiments, rule identification computing platform 110 may determine the threshold support count based on the entitlements occurring in a pattern. For example, if a large number of enterprise users have the entitlements, then the threshold support count may be higher, for example 30%. Similarly, if very few enterprise users have the entitlements, then the threshold support count may be lower, for example 2%. Generally, the threshold support count may be adjusted to avoid a large number of patterns that may not be relevant. In some embodiments, rule identification computing platform 110 may dynamically adjust the threshold support count in real-time. For example, rule identification computing platform 110 may detect a large number of patterns based on a first threshold support count, and may increase the threshold support count to detect fewer patterns. Also, for example, rule identification computing platform 110 may detect fewer or no patterns based on a first threshold support count, and may decrease the threshold support count to detect additional patterns.

Figure 3D:
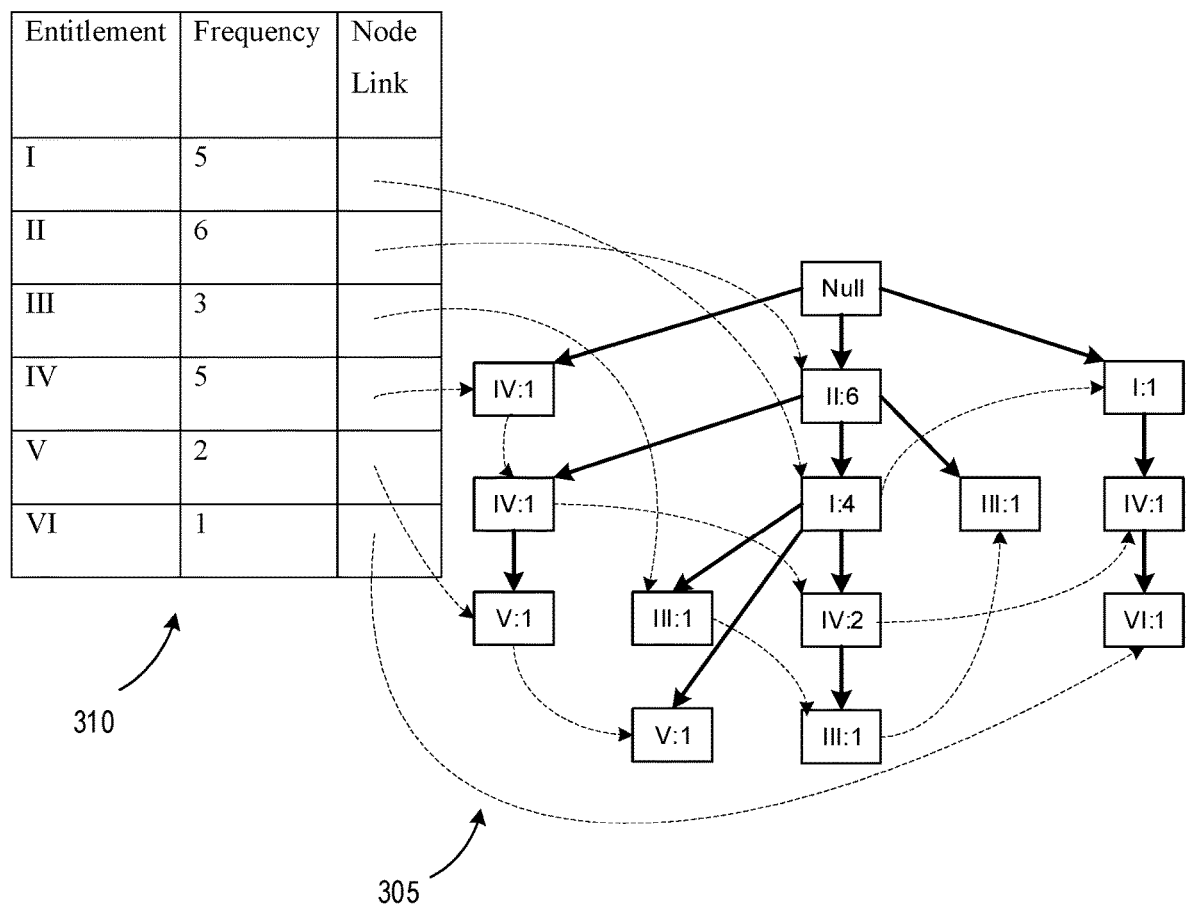

In some embodiments, rule identification computing platform 110 may generate the FP-tree based on the threshold support count. For example, based on the threshold support count, rule identification computing platform 110 may generate a conditional FP-tree, and detect patterns based on the conditional FP-tree. For example, assume that the threshold support count is 2. Referring to FIG. 3D, for entitlement III, a conditional list of entitlements may be determined as (II, I:1) corresponding to a branch II, I, III; (II, I, IV:1) corresponding to a branch II, I, IV, III; and (II:1) corresponding to a branch II, III. The entitlements appearing in the lists are II:3, I:2, and IV:1. Note that the entitlements are now listed with their respective conditional frequencies based on entitlement III. Based on a threshold support count of 2, entitlement IV does not meet the threshold support count; however, entitlements II and I meet the threshold support count. Accordingly, rule identification computing platform 110 may generate, based on the threshold support count, branches in a conditional FP-tree for entitlement III as II, I, III corresponding to the branch II, I, III; II, I, III corresponding to the branch II, I, IV, III; and II, III corresponding to the branch II, III. Additional branches of the conditional FP-tree may be determined for each of the entitlements, and the pattern may be detected in a manner similar to as described herein with reference to the FP-tree.

As described herein, a frequency of occurrence of a pattern may be based on a sub-group of users. Also, for example, a frequency of occurrence of a pattern may be based on a sub-collection of entitlements. As another example, a frequency of occurrence of a pattern may be based on a conditional FP-tree.

In some embodiments, rule identification computing platform 110 may determine, via the computing device and based on the frequency of occurrence, a correlation between the first entitlement and the second entitlement. For example, based on the pattern, rule identification computing platform 110 may determine that a first entitlement and a second entitlement are mutually exclusive 100% of the time. Accordingly, rule identification computing platform 110 may determine that the first entitlement and the second entitlement are negatively correlated with a correlation of −1. In some embodiments, rule identification computing platform 110 may determine that the first entitlement and the second entitlement are not mutually exclusive, and determine that the first entitlement and the second entitlement are negatively correlated with a correlation of −0.97.

At step 206, rule identification computing platform 110 may identify, based on the frequency of occurrence, a rule associated with the pattern. For example, rule identification computing platform 110 may determine that there are 2000 occurrences of entitlement II and entitlement VI being mutually exclusive, and that entitlement II and entitlement VI never appear together. Accordingly, rule identification computing platform 110 may infer that no user is associated with the first entitlement (e.g., entitlement II) and the second entitlement (entitlement VI). Rule identification computing platform 110 may identify a rule as: "entitlement II and entitlement VI are mutually exclusive."

For example, entitlement II may be associated with enterprise users that belong to a Technology Support ("Tech Support") team, and entitlement VI may be associated with enterprise users that belong to a Business team. Accordingly, rule identification computing platform 110 may identify a rule as: "entitlement II and entitlement VI are mutually exclusive; Tech Support team members have entitlement II, and Business team members have entitlement VI. Resolved." Generally, Tech Support teams and Business teams are likely to have multiple mutually exclusive entitlements, and rule identification computing platform 110 may periodically monitor the entitlements for each team to ensure that the entitlements that are to remain mutually exclusive are properly managed. For example, a new member may join the Tech Support team. In a prior role, the new member may have had both entitlement II and entitlement VI. Accordingly, based on a trigger that a change of role has occurred, rule identification computing platform 110 may automatically delete the new member's access to entitlement VI.

As another example, rule identification computing platform 110 may determine that there are 2000 occurrences of entitlement II and entitlement VI being mutually exclusive, and that entitlement II and entitlement VI appear together 20 times. Accordingly, rule identification computing platform 110 may determine that entitlement II and entitlement VI appear together 0.1% of all occurrences. In some embodiments, based on a low percentage, rule identification computing platform 110 may identify a rule to be: "entitlement II and entitlement VI are mutually exclusive." In some embodiments, rule identification computing platform 110 may determine that entitlement II and entitlement VI are required (e.g., based on enterprise policy), to be always mutually exclusive. Accordingly, rule identification computing platform 110 may identify a rule as: "entitlement II and entitlement VI are not mutually exclusive; overlap is 0.1%."

In some embodiments, rule identification computing platform 110 may determine that the first branch includes a node representing a second entitlement in the second branch. Accordingly, rule identification computing platform 110 may infer that one or more users have the first entitlement and the second entitlement. For example, referring to FIG. 3E, rule identification computing platform 110 may determine that first branch 315 includes a node representing a second entitlement, say entitlement IV, in second branch 320. Accordingly, rule identification computing platform 110 may infer that one or more users may have first entitlement, say entitlement III, and the second entitlement, entitlement IV. However, the FP-tree does not provide information on an identity of enterprise users that have these entitlements. Accordingly, rule identification computing platform 110 may query an enterprise data storage platform (e.g., enterprise data storage platform 130) and determine if an enterprise user has both entitlements. For example, rule identification computing platform 110 may determine that the enterprise user that has the entitlement list "II, I, IV, III" of first branch 315 is the same enterprise user that has entitlement list "I, IV, VI" of branch 320.

In some embodiments, rule identification computing platform 110 may then identify at least one attribute associated with the one or more users, and update, based on the at least one attribute, the rule. For example, rule identification computing platform 110 may have identified the rule as "entitlement III and entitlement IV are not mutually exclusive." In some instances, entitlement III and entitlement IV may need to be mutually exclusive. For example, entitlement III may generally correspond to an access permission provided to a first enterprise user who creates a trade, whereas entitlement IV may generally correspond to an access permission provided to a second enterprise user who executes the trade. Generally, the first enterprise user may not have entitlement IV whereas the second enterprise user may not have entitlement III. Upon a determination that the enterprise user, say a third enterprise user, that has the entitlement list "II, I, IV, III" of first branch 315 is the same enterprise user that has entitlement list "I, IV, VI" of branch 320, rule identification computing platform 110 may receive further confirmation that the third enterprise user is expected to have the two entitlements. For example, the third enterprise user may be an internal auditor that has oversight capacity for trade creation and trade execution. Based on such a determination, rule identification computing platform 110 may update the rule as "entitlement III and entitlement IV are not mutually exclusive; one overlapping user (role: audit); resolved."

In some embodiments, rule identification computing platform 110 may identify the rule based on the threshold support count. For example, a first entitlement and a second entitlement may be mutually exclusive when the threshold support count is at 30%, but may not be mutually exclusive when the threshold support count is at 20%. In some embodiments, rule identification computing platform 110 may identify the rule as "first entitlement and second entitlement are mutually exclusive" based on the threshold support count at 30%, whereas in some embodiments, rule identification computing platform 110 may identify the rule as "first entitlement and second entitlement are not mutually exclusive" based on the threshold support count at 20%. As described herein, rule identification computing platform 110 may adjust the threshold support count dynamically to update a rule.

In some embodiments, rule identification computing platform 110 may determine, via the computing device, a confidence level for the rule. A confidence level for the rule may be indicative of a strength for the rule. For example, for a rule for two entitlements to be mutually exclusive, if the correlation is −1, then rule identification computing platform 110 may determine a "high" confidence level for the rule. However, if the correlation is −0.95, then rule identification computing platform 110 may determine a "medium" confidence level for the rule. Accordingly, the confidence level may be adjusted based on the correlation. In some embodiments, confidence levels for predetermined ranges of correlation values may be associated with confidence levels and stored in an enterprise data storage platform (e.g., enterprise data storage platform 130), and rule identification computing platform 110 may retrieve such association from the enterprise data storage platform (e.g., enterprise data storage platform 130) to make the determination of the confidence level.

In some embodiments, rule identification computing platform 110 may determine the confidence level based on the frequency of occurrence of the pattern. For example, for a rule that a pair of entitlements are mutually exclusive, if the frequency of occurrence of a pattern where the pair of entitlements are not mutually exclusive is determined as 2% of all enterprise users, then the rule may be associated with a "high" confidence level, or a 98% confidence level. On the other hand, if the frequency of occurrence of a pattern where the pair of entitlements are not mutually exclusive is determined as 15% of all enterprise users, then the rule may be associated with a "medium" confidence level, or an 85% confidence level. As another example, if the frequency of occurrence of a pattern where the pair of entitlements are not mutually exclusive is determined as 35% of all enterprise users, then the rule may be associated with a "low" confidence level, or a 65% confidence level. As described herein, a confidence level of a rule may be based on a sub-group of users. Also, for example, a confidence level of a rule may be based on a sub-collection of entitlements. As another example, a confidence level of a rule may be based on a conditional FP-tree.

At step 207, rule identification computing platform 110 may trigger, via the computing device and based on the rule, an action related to one or more of the first entitlement and the second entitlement. For example, rule identification computing platform 110 may identify the rule as "entitlement II and entitlement VI are not mutually exclusive; overlap is 0.1%." Accordingly, in some embodiments, rule identification computing platform 110 may query the enterprise data storage platform (e.g., enterprise data storage platform 130) to determine the enterprise users that comprise the overlap of 0.1%. In some instances, rule identification computing platform 110 may trigger one or more alert notifications. For example, rule identification computing platform 110 may trigger an alert notification to an information technology personnel to confirm the entitlements for these enterprise users. In some embodiments, rule identification computing platform 110 may trigger an alert notification to a human resource personnel to confirm the entitlements for these enterprise users. In some embodiments, rule identification computing platform 110 may adjust a threshold support count for the rule. In some embodiments, cause an audit of the entitlements of the enterprise users that comprise the overlap of 0.1%. For example, if the entitlements are for highly confidential resources, and business roles of the enterprise users are not indicative of entitlements to the highly confidential resources, then rule identification computing platform 110 may suspend the entitlements, and alert relevant managers, security personnel, human resource personnel, and so forth.

In some embodiments, rule identification computing platform 110 may trigger the action based on the correlation. For example, as described herein, if the correlation for two entitlements to be mutually exclusive is −1, then rule identification computing platform 110 may not initiate further action. However, if the correlation for two entitlements to be mutually exclusive is negatively correlated with a value greater than −1, say −0.95, then rule identification computing platform 110 may initiate one or more actions as described herein. In some embodiments, rule identification computing platform 110 may trigger the action based on the confidence level. For example, a rule with a "high" confidence level may trigger a first action, whereas a rule with a "medium" confidence level may trigger a second action.

In some embodiments, rule identification computing platform 110 may modify, based on the rule, one or more of the first entitlement and the second entitlement. For example, a first entitlement may be access to a production server and a second entitlement may be access to a development server. Generally, access to these two servers may be mutually exclusive. However, rule identification computing platform 110 may identify a rule as "first entitlement and second entitlement are not mutually exclusive; one overlapping user." As described herein, rule identification computing platform 110 may retrieve additional information about the one user with both entitlements, including data such as job code, functionality, and so forth. Based on such data, rule identification computing platform 110 may identify that the enterprise user is on the production team, and rule identification computing platform 110 may leave the first entitlement to the production server in place, and remove the second entitlement to the development server.

As another example, a first entitlement may be access to a software design server, available to information technology teams, and a second entitlement may be access to a sales invoicing server available to information technology teams. Generally, access to these two servers may be mutually exclusive. However, rule identification computing platform 110 may identify a rule as "first entitlement and second entitlement are not mutually exclusive; two overlapping users." As described herein, rule identification computing platform 110 may retrieve additional information about the two users with both entitlements, including data such as job code, functionality, and so forth. Based on such data, rule identification computing platform 110 may identify that the first user is a manager in the production team, but also manages two employees who perform sales functions for the specific product that the manager's design team is responsible for. Accordingly, for the first user, rule identification computing platform 110 may leave the entitlements to the software design server and the sales invoicing server in place. Also, for example, rule identification computing platform 110 may identify the second user as a member of the first user's team, where the second user performs sales related functions, but is not a software designer. Accordingly, for the second user, rule identification computing platform 110 may leave the second entitlement to the sales invoicing server in place, and remove the first entitlement to the software design server.

In some embodiments, rule identification computing platform 110 may identify, based on the first branch, a first group of users sharing a common attribute, and modify, for one or more users of the first group, the first entitlement. For example, as described herein, rule identification computing platform 110 may detect that a first group of users that are on the security team do not appear on as users for an entitlement to a highly confidential server that may need to be monitored and kept secure behind a firewall. Accordingly, rule identification computing platform 110 may modify the entitlement for at least some of the identified users on the security team.

In some embodiments, rule identification computing platform 110 may identify, for the first branch, a first attribute for a first group of users associated with the first entitlement, identify, for the second branch, a second attribute for a second group of users associated with the second entitlement, and update, based on the first attribute and the second attribute, the rule. For example, rule identification computing platform 110 may identify that a first branch is associated with members of the software design team with entitlements to the software design server, whereas a second branch is associated with members of a product sales team with entitlements to the sales invoicing server. In some embodiments, rule identification computing platform 110 may have identified a rule such as "first entitlement and second entitlement are not mutually exclusive; five overlapping users." In some instances, rule identification computing platform 110 may determine that for the software design team and the product sales team, the five users are allowed to have both entitlements. Accordingly, rule identification computing platform 110 may update the rule as, for example, "entitlement to the software design server and entitlement to the sales invoicing server are mutually exclusive; five authorized users with access to both servers."

At step 208, rule identification computing platform 110 may recommend, based on the rule, an outcome for a request for an entitlement. As described herein, rule identification computing platform 110 may maintain a real-time record of entitlements that are permissible to appear together, as well as a real-time record of entitlements that are not permissible to appear together. Accordingly, when a request for an entitlement is received, rule identification computing platform 110 may search the real-time records and determine an outcome. For example, referring to FIG. 3D, if an enterprise user has entitlements II and III, and requests entitlement VI, rule identification computing platform 110 may recommend denial of the request as entitlements II and III are mutually exclusive with entitlement VI. In some embodiments, rule identification computing platform 110 may automatically deny the request, and in some instances, take additional measures to secure access to resources associated with entitlement VI by the enterprise user.

In some embodiments, rule identification computing platform 110 may access the threshold support count associated with the entitlements, determine if the request for the entitlement is consistent with the threshold support count, and recommend the outcome (e.g., allow the request or deny the request) based on whether the request for the entitlement is consistent with the threshold support count.

Referring to FIG. 2C, at step 209, rule identification computing platform 110 may monitor the relational database. In some embodiments, the relational database may be stored in the enterprise data storage platform (e.g., enterprise data storage platform 130), and may be updated in real time. As described herein, for a large enterprise organization, with a large number of employees, resources, network devices, geographic locations, business functions, and so forth, the relational database is likely to be highly dynamic, and undergo near real-time changes. For example, new software applications may be loaded, new employees may be added, some employees may leave or retire. Accordingly, there is a significant need for rule identification computing platform 110 to retrieve data from the enterprise data storage platform (e.g., enterprise data storage platform 130) and continually update the FP-tree, detect new patterns, update rules, update threshold support counts, and so forth.

At step 210, rule identification computing platform 110 may detect a change to the entitlement data. For example, rule identification computing platform 110 may detect that a new user with a job function "manager" has been added to the sales team.

At step 211, rule identification computing platform 110 may update, based on the detected change, the frequent pattern tree. For example, rule identification computing platform 110 may update the FP-tree or a conditional FP-tree based on the change. In some embodiments, rule identification computing platform 110 may update branches associated with an attribute (e.g., job function). For example, rule identification computing platform 110 may update branches associated with a job function "manager", or a job function "manager, IT".

At step 212, rule identification computing platform 110 may update, based on the updated frequent pattern tree, the rule. As described herein, any updates to the FP-tree may impact the pattern, and the rule. Accordingly, rule identification computing platform 110 may update the rule based on the new pattern, and/or an updated confidence level.

FIGS. 3A-3F depict an illustrative FP-tree model for identifying entitlement rules based on an FP-tree in accordance with one or more example embodiments. Referring to FIG. 3A, example lists of entitlements are illustrated in the second column of the table. For example, for example entitlements I-VI, various combinations of entitlements are illustrated. For example, item numbered "1" of the table in FIG. 3A illustrates a list of entitlements, "I, IV, II," item numbered "2" illustrates a list of entitlements, "IV, I, III, II," item numbered "3" illustrates a list of entitlements, "III, I, II," item numbered "4" illustrates a list of entitlements, "II, I, V," item numbered "5" illustrates a list of entitlements, IV, item numbered "6" illustrates a list of entitlements, "IV, II, V," item numbered "7" illustrates a list of entitlements, "I, IV, VI," and item numbered "8" illustrates a list of entitlements, "II, III."

Referring to FIG. 3B, the first column of the table lists the example entitlements I-VI, the second column lists a frequency for each example entitlement, and the third column lists a rank associated with each example entitlement. For example, entitlement I appears five times in the table of FIG. 3A. Accordingly, its frequency is "5". Likewise, in the table of FIG. 3A, entitlement II appears six times (its frequency is "6"), entitlement III appears three times (its frequency is "3"), entitlement IV appears five times (its frequency is "5"), entitlement II appears twice, (its frequency is "2") and entitlement II appears once (its frequency is "1").

It may be noted that the examples described herein are for illustrative purposes only. In general, a number of entitlements may be several thousand, and possible permutations and combinations of such thousands of entitlements may be a much larger number. Also, for example, any particular entitlement list in the table of FIG. 3A may be shared by thousands of enterprise users. As an example, the entitlement list "I, IV, II" may be shared by 20,000 users, whereas the entitlement list "IV, I, III, II" may be shared by 10,000 users. Accordingly, the corresponding frequencies in the table of FIG. 3B would also change. For example, the frequency associated with entitlement I would be updated to 30,003; the frequency associated with entitlement II would be updated to 30,004, the frequency associated with entitlement III would be updated to 10,002, and the frequency associated with entitlement IV would be updated to 30,003.

In some embodiments, a rank associated with each entitlement may be determined by ranking the entitlements in a decreasing order of their respective frequencies. In some embodiments, the entitlements may be initially ordered. For example, entitlement I may be assigned an initial order "1", whereas entitlement IV may be assigned an initial order "4." If two entitlements have the same frequency, then the initial order may determine the rank. For example, entitlement I and entitlement IV each have a frequency of "5". However, based on the initial orders, entitlement I has initial order "1," whereas entitlement IV has initial order "4." Accordingly, entitlement I is ranked higher than entitlement IV. The third column of the table of FIG. 3B lists the ranks for each entitlement. As illustrated, entitlement II with a frequency of "6" is ranked as "1," whereas entitlement VI with a frequency of "1" is ranked as "6."

Referring to FIG. 3C, the first two columns of the table are the same as the table of FIG. 3A. The third column of the table of FIG. 3C illustrates a reordering of each list of entitlements based on the ranks illustrated in FIG. 3B. For example, entitlement I is ranked "2," entitlement II is ranked "1," and entitlement IV is ranked "3." Accordingly, the list of entitlements "I, IV, II" may be re-ordered as "II, I, IV." Similarly, the list of entitlements "IV, I, III, II" may be re-ordered as "II, I, IV, III."

Referring to FIG. 3D, an example of an FP-tree 305 is depicted. One root is labeled "Null", with a collection of entitlement-prefix subtrees as children, and a frequent-entitlement header table 310. Table 310 shares some aspects of the table depicted in FIG. 3B. For example, the first two columns of table 310 are the same as the first two columns of the table depicted in FIG. 3B, whereas the third column labeled "Rank" of the table depicted in FIG. 3B is deleted and replaced with a third column labeled "Node Link" in table 310.

As depicted, each node in the entitlement-prefix subtree may include three fields, such as an entitlement name (e.g., entitlement name represented by the node), a count of a number of times the entitlement is represented by a portion of a path (represented by bold arrows) reaching the node, and a node-link, represented by a dashed arrow, which may be a link to a next node in the FP-tree that has the same entitlement name. For example, the node "II:6" represents entitlement II, which has a count of "6" and a node-link to the node, represented by a dashed arrow, where a head of the node-link is in Row 3, Column 3 of table 310. The paths are represented by bold arrows. Node "II:6" has a count of "6" since paths "II, IV, V", "II, I, III", "II, I, V", "II, I, IV", "II, I, IV, III", and "II, III" reach the node. Each entry in table has two fields, an entitlement-name and a head of a node-link. In example table 310, a frequency, or support count, is also provided.

Figure 3E:
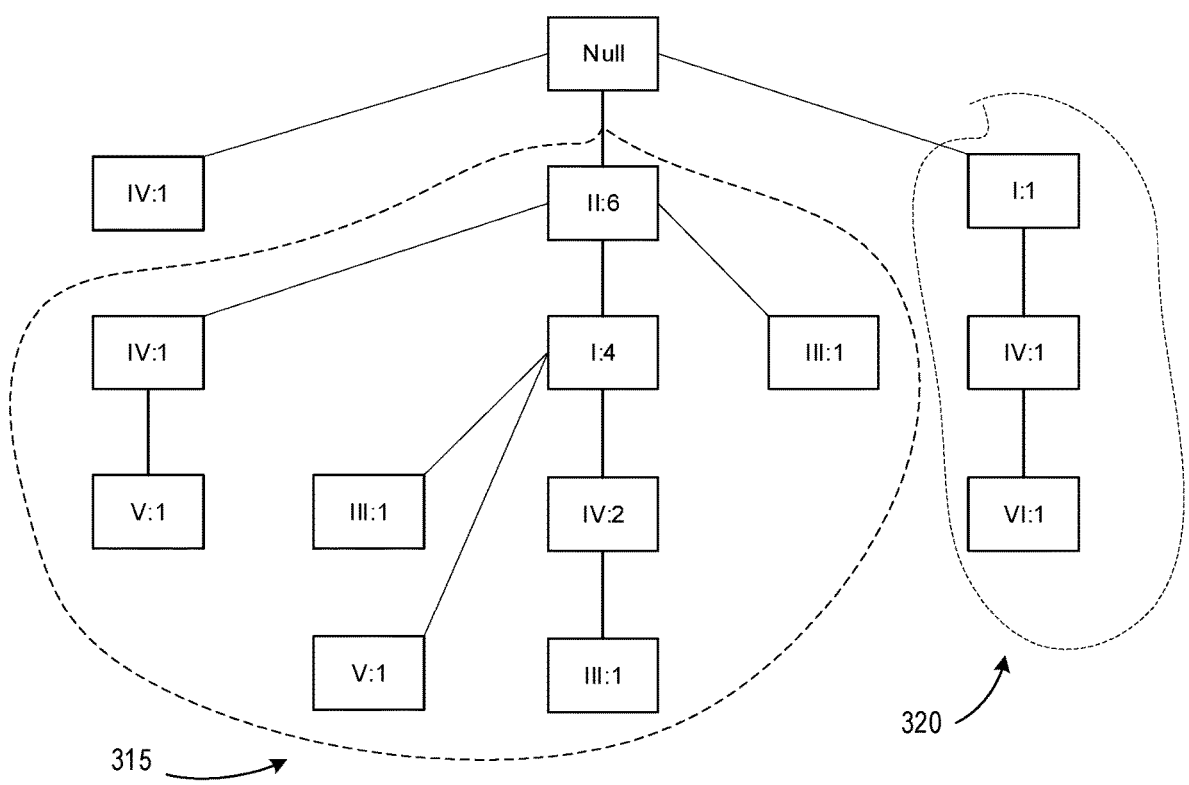

Referring to FIG. 3E, an FP-tree is illustrated based on the ordered entitlement list illustrated in FIG. 3C. A first branch 315 and a second branch 320 are illustrated. Second branch 320 includes a node representing entitlement VI whereas first branch 315 does not include any node representing entitlement VI. Likewise, first branch 315 includes nodes representing entitlements II, III, and V. Also, first branch 315 and second branch 320 each have nodes representing entitlements I and IV. Accordingly, a first rule may be identified as, for example, "entitlements II and VI are mutually exclusive." Also, for example, a second rule may be identified as, for example, "entitlements III and VI are mutually exclusive." As another example, a third rule may be identified as, for example, "entitlements V and VI are mutually exclusive."

Figure 3F:
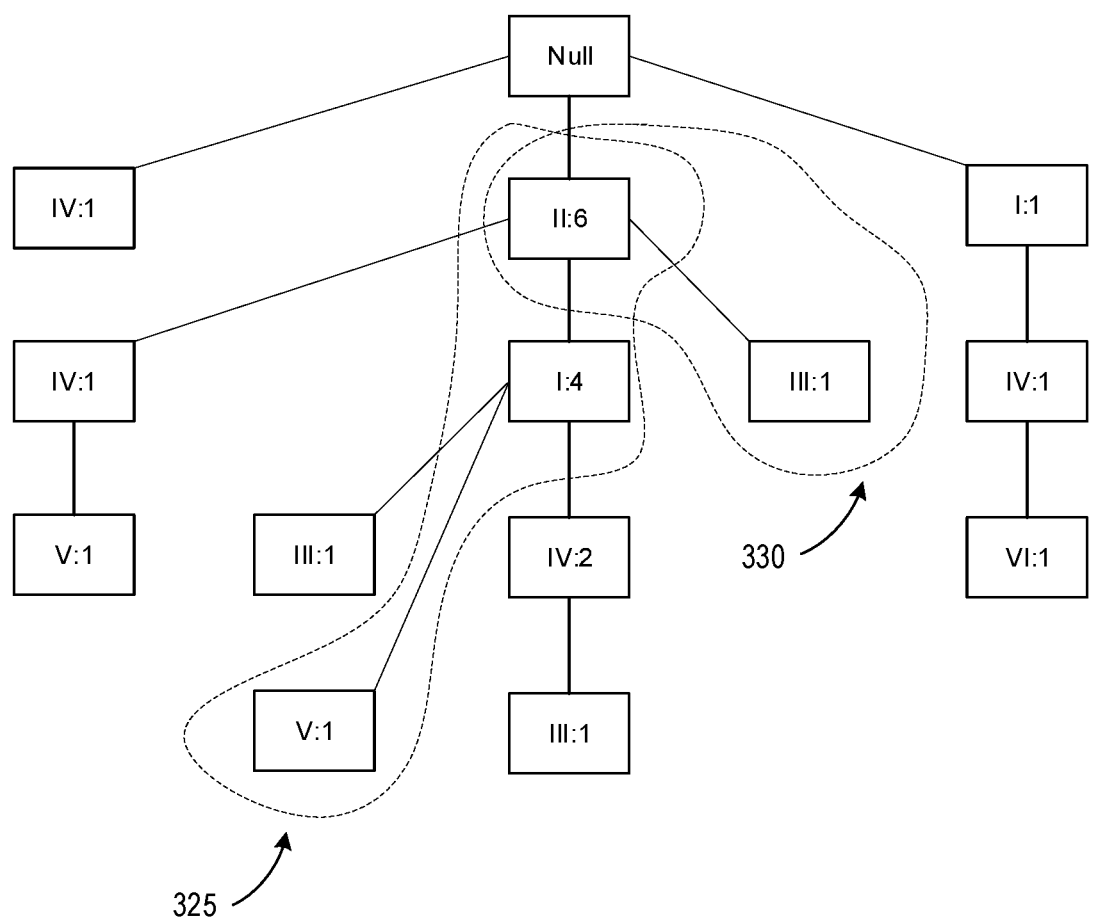

Referring to FIG. 3F, an FP-tree is illustrated based on the ordered entitlement list illustrated in FIG. 3C. For illustrative purposes, this is the same FP-tree depicted in FIG. 3E; however, different branches of the FP-tree are illustrated herein. A third branch 325 and a fourth branch 330 are illustrated. Fourth branch 330 includes a node representing entitlement III, whereas third branch 325 does not include any node representing entitlement III. Also, for example, third branch includes a node representing entitlement V, whereas fourth branch 330 does not include any node representing entitlement V. Accordingly, a fourth rule may be identified as, for example, "entitlements V and III are mutually exclusive." Although, based on a choice of third branch 325 and fourth branch 330, it may appear that entitlements I and III are mutually exclusive, a parent-child relationship in the FP-tree between entitlements I and III eliminate such a rule.

Figure 4:
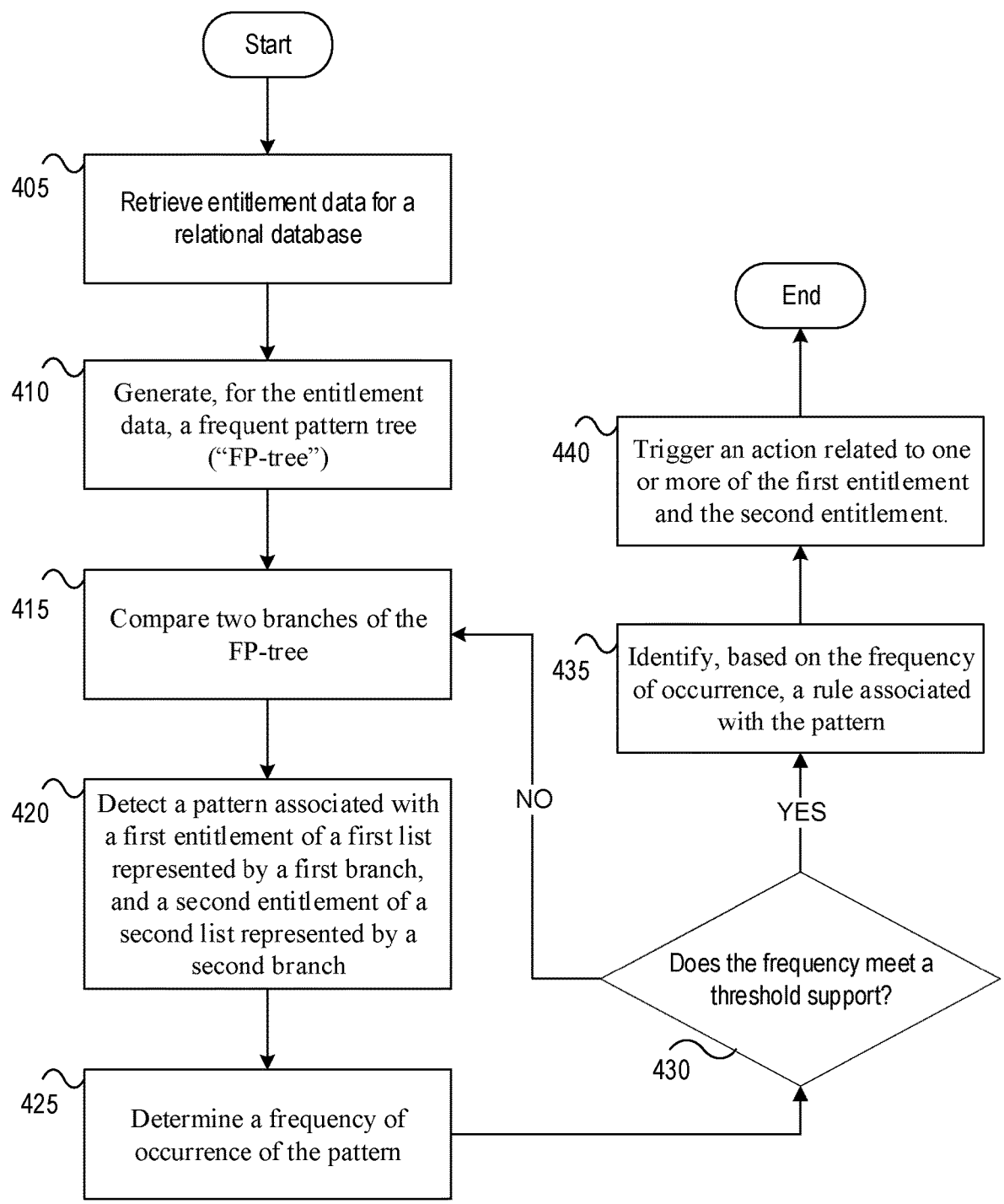
FIG. 4 depicts an illustrative method for identifying entitlement rules based on an FP-tree in accordance with one or more example embodiments.

FIG. 4 depicts an illustrative method for identifying entitlement rules based on an FP-tree in accordance with one or more example embodiments. Referring to FIG. 4, at step 405, a computing platform having at least one processor, a communication interface, and memory may retrieve, via a computing device, entitlement data associated with a relational database, where the entitlement data may be indicative of user entitlements to computing resources in an enterprise network. At step 410, the computing platform may generate, for the entitlement data, an FP-tree including a plurality of branches, where each branch may represent a list of entitlements that appear together in the relational database, and a plurality of nodes within each branch, where each node represents an entitlement, and a count of users associated with the entitlement. At step 415, the computing platform may compare, via the computing device, a first branch of the plurality of branches and a second branch of the plurality of branches. At step 420, the computing platform may detect, via the computing device and based on the comparing, a pattern associated with a first entitlement of a first list represented by the first branch, and a second entitlement of a second list represented by the second branch. At step 425, the computing platform may determine, based on the frequent pattern tree, a frequency of occurrence of the pattern. At step 430, the computing platform may determine if the frequency of occurrence meets a threshold (e.g., a minimum count). If at step 430, the computing platform determines that the frequency of occurrence does not meet the threshold, the process may return to step 415. In some embodiment, the process may adjust the threshold, and return to step 410. In some embodiments, the process may monitor the relational database, detect a change in an entitlement data, and return to step 405.

If at step 430, the computing platform determines that the frequency of occurrence meets the threshold, the process may proceed to step 435. At step 435, the computing platform may identify, based on the frequency of occurrence, a rule associated with the pattern. At step 440, the computing platform may trigger, via the computing device and based on the rule, an action related to one or more of the first entitlement and the second entitlement.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular time-sensitive tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform in an enterprise computing system, comprising:
   at least one processor;
   a communication interface communicatively coupled to the at least one processor; and
   memory storing computer-readable instructions that, when executed by the at least one processor, cause the computing platform to:
   retrieve, via a computing device, entitlement data associated with a relational database, wherein the entitlement data is indicative of user entitlements to computing resources in an enterprise network;
   generate, via the computing device and for the entitlement data, a frequent pattern tree spanning frequent entitlements for users of the enterprise computing system, wherein the frequent pattern tree comprises:
   a plurality of branches, wherein each branch represents a list of entitlements that appear together in the relational database; and
   a plurality of nodes within each branch, wherein each node represents an entitlement, and a count of users associated with the entitlement;
   compare, via the computing device, a first branch of the plurality of branches and a second branch of the plurality of branches;
   detect, via the computing device and based on the comparing, a pattern associated with a first entitlement of a first list represented by the first branch, and a second entitlement of a second list represented by the second branch;
   determine, based on the frequent pattern tree, a frequency of occurrence of the pattern;
   generate, based on the frequency of occurrence, a rule associated with the pattern;
   determine a confidence level of the rule, wherein the confidence level is based on a measured correlation of the first and second entitlements;
   when the confidence level is greater than a first confidence level, trigger, via the computing device and based on the rule, a first action related to one or more of the first entitlement and the second entitlement;
in response to the triggering, execute the first action, wherein the first action comprises changing a user entitlement of an enterprise user in accordance with the rule, wherein the user entitlement restricts access to computing devices of the enterprise computing system;
when the confidence level is less than a second confidence level, trigger a second action;
detect a number of patterns for a plurality of patterns;
dynamically adjust a support count threshold for the frequent pattern tree by:
when the number of patterns is above a first occurrence threshold, increase the support count threshold; and
when the number of patterns is below a second occurrence threshold, decrease the support count threshold; and
identify, in response to the adjusting, the pattern based on the threshold support count.

2. The computing platform of claim 1, wherein the instructions that cause the computing platform to trigger the first action comprise additional computer-readable instructions that, when executed by the at least one processor, cause the computing platform to:
recommend, via the computing device and based on the rule, an outcome for an entitlement request.

3. The computing platform of claim 1, wherein the instructions that cause the computing platform to trigger the first action comprise additional computer-readable instructions that, when executed by the at least one processor, cause the computing platform to:
modify, based on the rule, one or more of the first entitlement and the second entitlement.

4. The computing platform of claim 1, wherein the memory stores additional computer-readable instructions that, when executed by the at least one processor, cause the computing platform to:
identify, based on the first branch, a first group of users sharing a common attribute; and
modify, for one or more users of the first group, the first entitlement.

5. The computing platform of claim 1, wherein the memory stores additional computer-readable instructions that, when executed by the at least one processor, cause the computing platform to:
monitor the relational database;
detect a change to the entitlement data; and
update, based on the detected change, the frequent pattern tree.

6. The computing platform of claim 5, wherein the memory stores additional computer-readable instructions that, when executed by the at least one processor, cause the computing platform to:
update, based on the updated frequent pattern tree, the rule.

7. The computing platform of claim 1, wherein the memory stores additional computer-readable instructions that, when executed by the at least one processor, cause the computing platform to:
identify, for the first branch, a first attribute for a first group of users associated with the first entitlement;
identify, for the second branch, a second attribute for a second group of users associated with the second entitlement;
update, based on the first attribute and the second attribute, the rule.

8. The computing platform of claim 1, wherein the instructions to detect the pattern comprise additional computer-readable instructions that, when executed by the at least one processor, cause the computing platform to:
determine that the first branch does not include a first node representing the second entitlement, and that the second branch does not include a second node representing the first entitlement; and
wherein the instructions that cause the computing platform to identify the rule comprise additional computer-readable instructions that, when executed by the at least one processor, cause the computing platform to infer that no user is associated with the first entitlement and the second entitlement.

9. The computing platform of claim 1, wherein the instructions to detect the pattern comprise additional computer-readable instructions that, when executed by the at least one processor, cause the computing platform to:
determine that the first branch includes a node representing the second entitlement; and
wherein the instructions that cause the computing platform to identify the rule comprise additional computer-readable instructions that, when executed by the at least one processor, cause the computing platform to:
infer that one or more users have the first entitlement and the second entitlement;
identify at least one attribute associated with the one or more users; and
update, based on the at least one attribute, the rule.

10. A method in an enterprise computing system, comprising:
at a computing platform comprising at least one processor, a communication interface, and memory:
retrieving, via a computing device, entitlement data associated with a relational database, wherein the entitlement data is indicative of user entitlements to computing resources in an enterprise network;
generating, via the computing device and for the entitlement data, a frequent pattern tree spanning frequent entitlements for users of the enterprise computing system, wherein the frequent pattern tree comprises:
a plurality of branches, wherein each branch represents a list of entitlements that appear together in the relational database; and
a plurality of nodes within each branch, wherein each node represents an entitlement, and a count of users associated with the entitlement;
comparing, via the computing device, a first branch of the plurality of branches and a second branch of the plurality of branches;
detecting, via the computing device and based on the comparing, a pattern associated with a first entitlement of a first list represented by the first branch, and a second entitlement of a second list represented by the second branch, wherein the pattern is one of a plurality of patterns;
determining, based on the frequent pattern tree, a frequency of occurrence of the pattern;
identifying, based on the frequency of occurrence, a rule associated with the pattern;
triggering, via the computing device and based on the rule, a first action related to one or more of the first entitlement and the second entitlement;
detecting a number of patterns for the plurality of patterns;

dynamically adjusting a support count threshold for the frequent pattern tree by:
  when the number of patterns is above a first occurrence threshold, increasing the support count threshold; and
  when the number of patterns is below a second occurrence threshold, decreasing the support count threshold; and
identifying, in response to the adjusting, the pattern based on the threshold support count; and
executing the first action comprising changing a user entitlement of an enterprise user in accordance with the rule, wherein the user entitlement restricts access to computing devices of the enterprise computing system.

11. The method of claim 10, further comprising:
recommending, via the computing device and based on the rule, an outcome for a new user entitlement request.

12. The method of claim 10, further comprising:
modifying, via the computing device and based on the rule, one or more of the first entitlement and the second entitlement.

13. The method of claim 10, wherein the first branch represents a first group, and the method further comprising:
monitoring, via the computing device, the relational database;
detecting, via the computing device, a change to the entitlement data;
updating, via the computing device and based on the detected change, the frequent pattern tree; and
updating, based on the updated frequent pattern tree, the rule.

14. The method of claim 10, further comprising:
determining that the first branch does not include a first node representing the second entitlement, and that the second branch does not include a second node representing the first entitlement; and
inferring that no user is associated with the first entitlement and the second entitlement.

15. The method of claim 10, further comprising:
determining a confidence level of the rule, wherein the confidence level is based on a measured correlation of the first and second entitlements;
when the confidence level is greater than a first confidence level, triggering, via the computing device and based on the rule, a first action related to one or more of the first entitlement and the second entitlement; and
when the confidence level is less than a second confidence level, triggering a second action.

16. One or more non-transitory computer-readable media storing instructions that, when executed by a computing platform comprising at least one processor, a communication interface, and memory, cause the computing platform to:

retrieve, via a computing device, entitlement data associated with a relational database, wherein the entitlement data is indicative of user entitlements to computing resources in an enterprise network;
generate, via the computing device and for the entitlement data, a frequent pattern tree spanning frequent entitlements for users of an enterprise computing system, wherein the frequent pattern tree comprises:
  a plurality of branches, wherein each branch represents a list of entitlements that appear together in the relational database; and
  a plurality of nodes within each branch, wherein each node represents an entitlement, and a count of users associated with the entitlement;
compare, via the computing device, a first branch of the plurality of branches and a second branch of the plurality of branches;
detect, via the computing device and based on the comparing, a pattern associated with a first entitlement of a first list represented by the first branch, and a second entitlement of a second list represented by the second branch, wherein the pattern is one of a plurality of patterns;
determine, based on the frequent pattern tree, a frequency of occurrence of the pattern;
identify, based on the frequency of occurrence, a rule associated with the pattern;
determine a confidence level of the rule, wherein the confidence level is based on a measured correlation of the first and second entitlements;
when the confidence level is greater than a first confidence level, trigger, via the computing device and based on the rule, a first action related to one or more of the first entitlement and the second entitlement;
in response to the triggering, execute the first action, wherein the first action comprises configuring a user entitlement of an enterprise user in accordance with the rule, wherein the user entitlement restricts access to computing devices of the enterprise computing system;
when the confidence level is less than a second confidence level, trigger a second action;
detect a number of patterns for the plurality of patterns;
dynamically adjust a support count threshold for the frequent pattern tree by:
  when the number of patterns is above a first occurrence threshold, increase the support count threshold; and
  when the number of patterns is below a second occurrence threshold, decrease the support count threshold; and
identify, in response to the adjusting, the pattern based on the threshold support count.

* * * * *